US 9,230,047 B1

(12) United States Patent
Van Antwerpen et al.

(10) Patent No.: US 9,230,047 B1
(45) Date of Patent: Jan. 5, 2016

(54) METHOD AND APPARATUS FOR PARTITIONING A SYNTHESIS NETLIST FOR COMPILE TIME AND QUALITY OF RESULTS IMPROVEMENT

(75) Inventors: Babette Van Antwerpen, Mountain View, CA (US); Gregg William Baeckler, San Jose, CA (US)

(73) Assignee: Altera Corporation, San Jose, CA (US)

( * ) Notice: Subject to any disclaimer, the term of this patent is extended or adjusted under 35 U.S.C. 154(b) by 435 days.

(21) Appl. No.: 12/802,669

(22) Filed: Jun. 11, 2010

(51) Int. Cl.
*G06F 17/50* (2006.01)

(52) U.S. Cl.
CPC ............ *G06F 17/505* (2013.01); *G06F 17/504* (2013.01); *G06F 17/5022* (2013.01); *G06F 17/5045* (2013.01); *G06F 2217/78* (2013.01)

(58) Field of Classification Search
None
See application file for complete search history.

(56) References Cited

U.S. PATENT DOCUMENTS

| | | | | |
|---|---|---|---|---|
| 6,102,964 A * | 8/2000 | Tse et al. | | 716/116 |
| 6,195,788 B1 * | 2/2001 | Leaver et al. | | 716/116 |
| 6,295,636 B1 * | 9/2001 | Dupenloup | | 716/103 |
| 6,360,356 B1 * | 3/2002 | Eng | | 716/105 |
| 6,701,504 B2 * | 3/2004 | Chang et al. | | 716/122 |
| 6,854,096 B2 * | 2/2005 | Eaton et al. | | 716/122 |
| 7,134,100 B2 * | 11/2006 | Ravi et al. | | 716/103 |
| 7,143,367 B2 * | 11/2006 | Eng | | 716/102 |
| 7,171,633 B1 * | 1/2007 | Hwang et al. | | 716/103 |
| 7,281,233 B1 * | 10/2007 | Sivasubramaniam | | 716/105 |
| 7,337,100 B1 * | 2/2008 | Hutton et al. | | 703/13 |
| 7,380,226 B1 * | 5/2008 | Goldberg | | 716/105 |
| 7,415,693 B1 * | 8/2008 | van Antwerpen et al. | | 716/104 |
| 7,464,362 B1 * | 12/2008 | Borer et al. | | 716/138 |
| 7,653,884 B2 * | 1/2010 | Furnish et al. | | 716/103 |
| 7,669,157 B1 * | 2/2010 | Borer et al. | | 716/103 |
| 2003/0121010 A1 * | 6/2003 | Aubury | | 716/4 |
| 2004/0068331 A1 * | 4/2004 | Cronquist | | 700/18 |
| 2004/0103377 A1 * | 5/2004 | Eaton et al. | | 716/1 |
| 2007/0245281 A1 * | 10/2007 | Riepe et al. | | 716/9 |
| 2010/0169858 A1 * | 7/2010 | Betz et al. | | 716/12 |
| 2012/0254818 A1 * | 10/2012 | Liu et al. | | 716/124 |
| 2014/0223403 A1 * | 8/2014 | Betz et al. | | 716/131 |

OTHER PUBLICATIONS

A. Prabhu, Logopt—A Multi-Level Logic Synthesis and Optimization System, Proceedings of the 1989 IEEE Custom Integrated Circuits Conference, pp. 4.1/1-4.1/4, May 1989.*

* cited by examiner

*Primary Examiner* — A. M. Thompson
(74) *Attorney, Agent, or Firm* — L. Cho

(57) ABSTRACT

A method for designing a system on a target device is disclosed. A partition in the system with a plurality of instances from an extraction netlist is identified. Synthesis optimizations are performed on the partition to generate a synthesis optimization solution. The synthesis optimization solution is applied to the plurality of instances in the system.

26 Claims, 20 Drawing Sheets

INITIAL PARTITIONS AND CONNECTIONS

| partition | Made from | Instances | size |
|---|---|---|---|
| A | Input a | 1 | 1 |
| B | Input b | 1 | 1 |
| C | Input c | 1 | 1 |
| D | Input d | 1 | 1 |
| E | Input e | 1 | 1 |
| F | Input f | 1 | 1 |
| G | Input g | 1 | 1 |
| H | Output r | 1 | 1 |
| I | Output s | 1 | 1 |
| J | 2-input and's h,j,l,n | 1,2,3,4 | 1 |
| K | 3-input and's i,m | 1,2 | 1 |
| L | 3-input or's k,o | 1,2 | 1 |
| M | Registers p,q | 1,2 | 1 |

| Connection from (partition,instance,output) | Connection to 1 or more (part,instance,input) |
|---|---|
| (A,1,0) | (J,1,0) (K,1,0) |
| (B,1,0) | (J,1,1) (J,3,1) |
| (C,1,0) | (K,1,1) (J,2,0) (K,2,1) (J,4,0) |
| (D,1,0) | (K,1,2) (K,2,2) |
| (E,1,0) | (J,2,1) |
| (F,1,0) | (J,3,0) (K,2,0) |
| (G,1,0) | (J,4,1) |
| (J,1,0) | (L,1,0) |
| (K,1,0) | (L,1,1) |
| (J,2,0) | (M,1,0) |
| (J,3,0) | (L,2,0) |
| (K,2,0) | (L,2,1) |
| (J,4,0) | (M,2,0) |
| (M,1,0) | (L,1,2) |
| (M,2,0) | (L,2,2) |
| (L,1,0) | (H,1,0) |
| (L,2,0) | (I,1,0) |

FIG. 4C

MERGE SET

| Id | Partitions | Partition instance pairs | Absorbed connections | Cost before | Cost after | Cost savings |
|---|---|---|---|---|---|---|
| 1 | J,M | (2,1) (4,2) | (J,2,0) – (M,1,0) (J,4,0) – (M,2,0) | 1+4+1+2 = 8 | 2+2+1+2 = 7 | 1 |
| 2 | K,L | (1,1) (2,2) | (K,1,0) – (L,1,0) (K,2,0) – (L,2,0) | 1+2+1+2 = 6 | 2+2 = 4 | 2 |
| 3 | J,L | (1,1) (3,2) | (J,1,0) – (L,1,0) (J,3,0) – (L,2,0) | 1+4+1+2 = 8 | 2+2+1+2 = 7 | 1 |
| 4 | M,L | (1,1) (2,2) | (M,1,0) – (L,1,2) (M,2,0) – (L,2,2) | 1+2+1+2 = 6 | 2+2 = 4 | 2 |

FIG. 4D

PARTITIONS AND CONNECTIONS AFTER FIRST ROUND OF EXPANSION

| partition | Made from | instances | size | Connection from (partition,instance,output) | Connection to 1 or more (part,instance,input) |
|---|---|---|---|---|---|
| A | Input a | 1 | 1 | (A,1,0) | (J,1,0) (N,1,1) |
| B | Input b | 1 | 1 | (B,1,0) | (J,1,1) (J,3,1) |
| C | Input c | 1 | 1 | (C,1,0) | (N,1,2) (O,1,0) (N,2,2) (O,2,0) |
| D | Input d | 1 | 1 | (D,1,0) | (N,1,3) (N,2,3) |
| E | Input e | 1 | 1 | (E,1,0) | (O,1,1) |
| F | Input f | 1 | 1 | (F,1,0) | (J,3,0) (N,2,1) |
| G | Input g | 1 | 1 | (G,1,0) | (O,2,1) |
| H | Output r | 1 | 1 | (J,1,0) | (N,1,0) |
| I | Output s | 1 | 1 | (J,3,0) | (N,2,0) |
| J | 2-input and's h,I | 1,3 | 1 | (O,1,0) | (N,1,4) |
| N | Merged from K inst 1,2 and L inst 1,2 | 2 | 2 | (O,2,0) | (N,2,4) |
| | | | | (N,1,0) | (H,1,0) |
| O | Merged from J inst 2,4 and M inst 1,2 | 2 | 2 | (N,2,0) | (I,1,0) |

FIG. 5A

MERGE SET AFTER FIRST ROUND OF EXPANSION

| Id | Partitions | Partition instance pairs | Absorbed connections | Cost before | Cost after | Cost savings |
|---|---|---|---|---|---|---|
| 1 | O,N | (1,1) (2,2) | (O,1,0) – (N,1,4) (O,2,0) – (N,2,4) | 2+2+2+2=8 | 4+2=6 | 2 |
| 2 | J,N | (1,1) (3,2) | (J,1,0) – (N,1,0) (J,3,0) – (N,2,0) | 1+2+2+2=7 | 3+2=5 | 2 |

FIG. 5B

PARTITIONS AND CONNECTIONS AFTER SECOND ROUND OF EXPANSION

| partition | Made from | instances | size | Connection from (partition,instance,output) | Connection to 1 or more (part,instance,input) |
|---|---|---|---|---|---|
| A | Input a | 1 | 1 | (A,1,0) | (P,1,1) |
| B | Input b | 1 | 1 | (B,1,0) | (P,1,0) (P,2,0) |
| C | Input c | 1 | 1 | (C,1,0) | (P,1,2) (J,2,0) (P,2,2) (J,4,0) |
| D | Input d | 1 | 1 | (D,1,0) | (P,1,3) (P,2,3) |
| E | Input e | 1 | 1 | (E,1,0) | (O,1,1) |
| F | Input f | 1 | 1 | (F,1,0) | (P,2,1) |
| G | Input g | 1 | 1 | (G,1,0) | (O,2,1) |
| H | Output r | 1 | 1 | (O,1,0) | (P,1,4) |
| I | Output s | 1 | 1 | (O,2,0) | (P,2,4) |
| O | Merged from J inst 2,4 and M inst 1,2 | 1,2 | 2 | (P,1,0) | (H,1,0) |
| P | Merged from J inst 1,3 and N inst 1,2 | 1,2 | 3 | (P,2,0) | (I,1,0) |

FIG. 6A

MERGE SET AFTER SECOND ROUND OF EXPANSION

| Id | Partitions | Partition instance pairs | Absorbed connections | Cost before | Cost after | Cost savings |
|---|---|---|---|---|---|---|
| 1 | O,P | (1,1)<br>(2,2) | (O,1,0) – (P,1,4)<br>(O,2,0) – (P,2,4) | 2+2+3+2=9 | 5+2=7 | 2 |

FIG. 6B

PARTITIONS AND CONNECTIONS AFTER THIRD ROUND OF EXPANSION

| partition | Made from | instances | size | Connection from (partition,instance,output) | Connection to 1 or more (part,instance,input) |
|---|---|---|---|---|---|
| A | Input a | 1 | 1 | (A,1,0) | (Q,1,1) |
| B | Input b | 1 | 1 | (B,1,0) | (Q,1,0) (Q,2,0) |
| C | Input c | 1 | 1 | (C,1,0) | (Q,1,2) (Q,2,2) |
| D | Input d | 1 | 1 | (D,1,0) | (Q,1,3) (Q,2,3) |
| E | Input e | 1 | 1 | (E,1,0) | (Q,1,4) |
| F | Input f | 1 | 1 | (F,1,0) | (Q,2,1) |
| G | Input g | 1 | 1 | (G,1,0) | (Q,2,4) |
| H | Output r | 1 | 1 | (Q,1,0) | (H,1,0) |
| I | Output s | 1 | 1 | (Q,2,0) | (I,1,0) |
| Q | Merged from O inst 1,2 and P inst 1,2 | 2 | 5 | | |

METHOD AND APPARATUS FOR PARTITIONING A SYNTHESIS NETLIST FOR COMPILE TIME AND QUALITY OF RESULTS IMPROVEMENT

FIELD

Embodiments of the present invention relate to tools for designing systems on target devices. More specifically, embodiments of the present invention relate to a method and apparatus for partitioning a synthesis netlist for compile time and quality of results improvement.

BACKGROUND

Target devices such as field programmable gate arrays (FPGAs), structured application specific integrated circuits (ASICs), and ASICs are used to implement large systems that may include million of gates and megabits of embedded memory. The complexity of large systems often requires the use of electronic design automation (EDA) tools to create and optimize a design for the system onto physical target devices. Among the procedures performed by EDA tools in a computer aided design (CAD) flow are synthesis, placement, and routing. When designing large systems to be implemented on large target devices, EDA tools may require a large amount of time to perform these compilation procedures.

Although the design process is automated with EDA tools, generating a satisfactory system design may still be time consuming. It is an ongoing effort for EDA tool designers to shorten the runtime of its algorithms. By shortening the runtime of its algorithms, more flexibility may be offered to the system designer using the EDA tool and/or additional algorithms may be implemented in the EDA tool in order to further improve a system design.

In FPGA design, system designs are very structured in nature. It is not uncommon for a system design to include a plurality of subnetworks (subnets) that have common characteristics. Current EDA tools execute algorithms on a subnet regardless of whether an identical subnet had been previously processed. For system designs that include a large number of subnets having identical characteristics, this results in the consumption of a significant amount of time and computing resources for repetitive computations.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 4C illustrates a partitions table and a connections table of the initial partitions according to an embodiment of the present invention.

FIG. 4D illustrates a table listing a merge set according to an embodiment of the present invention.

FIG. 5A illustrates a partitions table and a connections table after a first round of expansion according to an embodiment of the present invention.

FIG. 5B illustrates a table listing a merge set after a first round of expansion according to an embodiment of the present invention.

FIG. 6A illustrates a partitions table and a connections table after a second round of expansion according to an embodiment of the present invention.

FIG. 6B illustrates a table listing a merge set after a second round of expansion according to an embodiment of the present invention.

FIG. 7 illustrates a partitions table and a connections table after a third round of expansion according to an embodiment of the present invention.

SUMMARY

According to an embodiment of the present invention, a method and apparatus for designing a system on a target device is disclosed where partition in the system having a plurality of instances is identified from an extraction netlist. Synthesis optimizations are performed on the partition to generate a synthesis optimization solution. The synthesis optimization solution is applied to the plurality of instances in the system. By identifying a partition with multiple instances and optimizing the partition once, savings in compile time and memory may be achieved. In addition, more aggressive optimization procedures may be applied to partitions having a large number of instances in order to achieve better quality of results such as reduced resource usage and improved clock speed.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
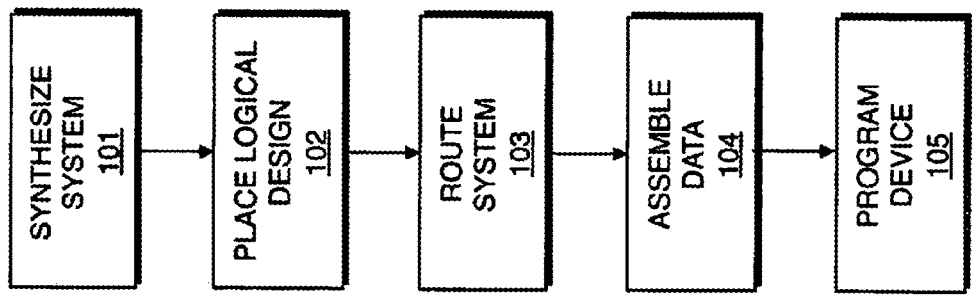
FIG. 1 is a flow chart illustrating a method for designing a system according to an exemplary embodiment of the present invention.

FIG. 1 is a flow chart illustrating a method for designing a system on a target device according to an exemplary embodiment of the present invention. FIG. 1 is labeled "FIG. 1" in the drawings. The term "FIG." is used throughout the drawings as an abbreviation for the word "Figure". The target device may be a field programmable gate array (FPGA), application specific integrated circuit (ASIC), a structured ASIC, or other device. According to one embodiment, the procedure illustrated in FIG. 1 may be performed by a computer aided design (CAD)/electronic design automation (EDA) tool implemented on a computer system. At 101, the system is synthesized. According to an embodiment of the present invention, synthesis involves generating a logic design of the system to be implemented.

Figure 2:
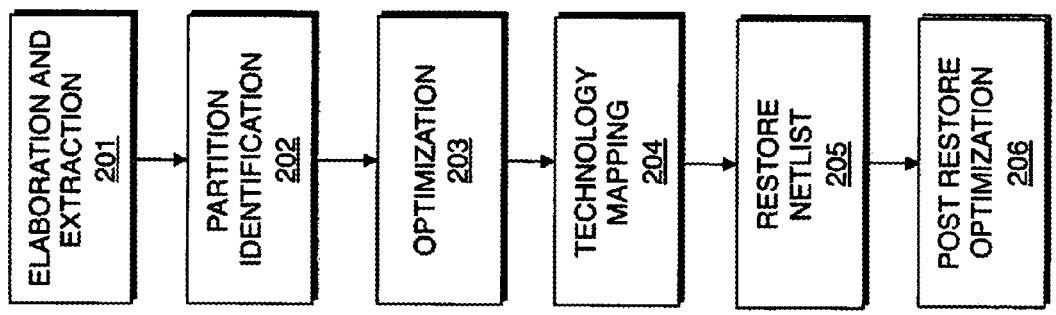
FIG. 2 is a flow chart illustrating a method for performing synthesis according to an embodiment of the present invention.

FIG. 2 is a flow chart illustrating a method for performing synthesis according to an embodiment of the present invention. The procedures illustrated in FIG. 2 may be utilized to implement 101 shown in FIG. 1. At 201 elaboration and extraction is performed. According to an embodiment of the present invention, elaboration and extraction includes generating a logical representation of the system from a high level description of the system. The high level description of the system may be in the form of schematics, VHDL, Verilog or other design definition. The logical representation may include a representation that includes functional blocks and registers ("components"), such as logic gates and logic elements, required for the system. During elaboration and extraction, initial optimizations may also be performed. The initial optimizations may include the cleanout of netlists and constant propagation. An extraction netlist is created during extraction.

At 202, partitions are identified from the extraction netlist. According to an embodiment of the present invention, partitions are identified based upon their size and number of instances they occur in the extraction netlist. Partitions in the extraction netlist may be replaced with a higher-level gate (substitute component) to form a top-level netlist. A separate netlist may be generated for each substitute component. The netlist for a substitute component may be referred to as a bottom-level netlist. Together, the top-level and bottom-level extraction netlists form a hierarchical netlist.

At 203, optimizations are performed on the top-level and bottom-level netlists to reduce area and to improve speed of the system. The optimizations may include performing procedures such as high level logic synthesis of adders, multiplexers and state machines, lower level multi level synthesis optimizations that operate on combinational gates and registers, and technology mapping to create a netlist of blocks that are supported by the resources available on the target device. It should be appreciated that the lower level multi level synthesis optimizations may include sequential synthesis transformations such as register retiming, duplication, and merging. A synthesis optimizations netlist is created during synthesis optimizations. According to an embodiment of the present invention, a different class of optimization procedures or algorithms may be applied to the bottom-level netlists that include partitions having a plurality of instances. The different class of procedures or algorithms may be more aggressive and more likely to yield better quality of results by reducing the number of resources required for implementing the partition and/or increasing the speed of the partition. The class of procedures or algorithms may be different than the class of procedures or algorithms used for optimizing other circuits in the system design in that they require more time to execute. Utilizing these more aggressive, but slower algorithms on the partitions in the bottom-level netlist may be beneficial in that the improved results generated may be implemented many times as oppose to once or only a few times. According to an embodiment of the present invention, a predetermined threshold number of instance may be utilized to identify partitions which are to be optimized using the more aggressive optimization procedures or algorithms. The predetermined threshold number may be for example in the magnitude of 100, 1000, or 10,000 instances of a partition. Top-level and bottom-level optimization netlists are created during optimization.

At 204, mapping (technology mapping) is performed on the optimized logic design in the top-level and bottom-level optimization netlists. According to an embodiment of the present invention, mapping includes determining how to implement logic gates and logic elements in the optimized logic representation with resources available on the target device. The resources available may include LUTs and other resources. According to an embodiment of the present invention, top-level and bottom-level technology mapped netlists are generated from the technology mapping.

At 205, the netlist is restored. According to an embodiment of the present invention, restoring the netlist includes flattening out the hierarchical netlist by merging the bottom-level technology mapped netlist with the top-level technology mapped netlist. Portions of the bottom-level netlist representing a substitute component is merged back with the top-level netlist to form a single technology-mapped netlist.

At 206, post restore optimizations are performed. According to an embodiment of the present invention, optimizations may be performed on the restored netlist as a whole. According to one aspect, optimizations may be performed around boundaries of the partitions. When the partitions were mapped separately, optimizations were not performed across partition boundaries. Post restore optimizations may address optimizations that may have been missed.

Referring back to FIG. 1, at 102, components in the mapped logical system design are placed. Placement works on the technology-mapped netlist to produce a placement for each of the functional blocks. According to an embodiment of the present invention, placement includes fitting the system on the target device by determining which resources on the logic design are to be used for specific logic elements, and other function blocks determined to implement the system as determined during synthesis. Placement may include clustering which involves grouping logic elements together to form the logic clusters present on the target device. According to an embodiment of the present invention, clustering is performed at an early stage of placement and occurs directly after synthesis during the placement preparation stage.

At 103, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 104, an assembly procedure is performed. The assembly procedure involves creating a data file that includes information determined by the compilation procedure described by 101-103. The data file may be a bit stream that may be used to program a target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium.

At 105, the target device is programmed with the data file. By programming the target with the data file, components on the target device are physically transformed to implement the system.

Figure 3:
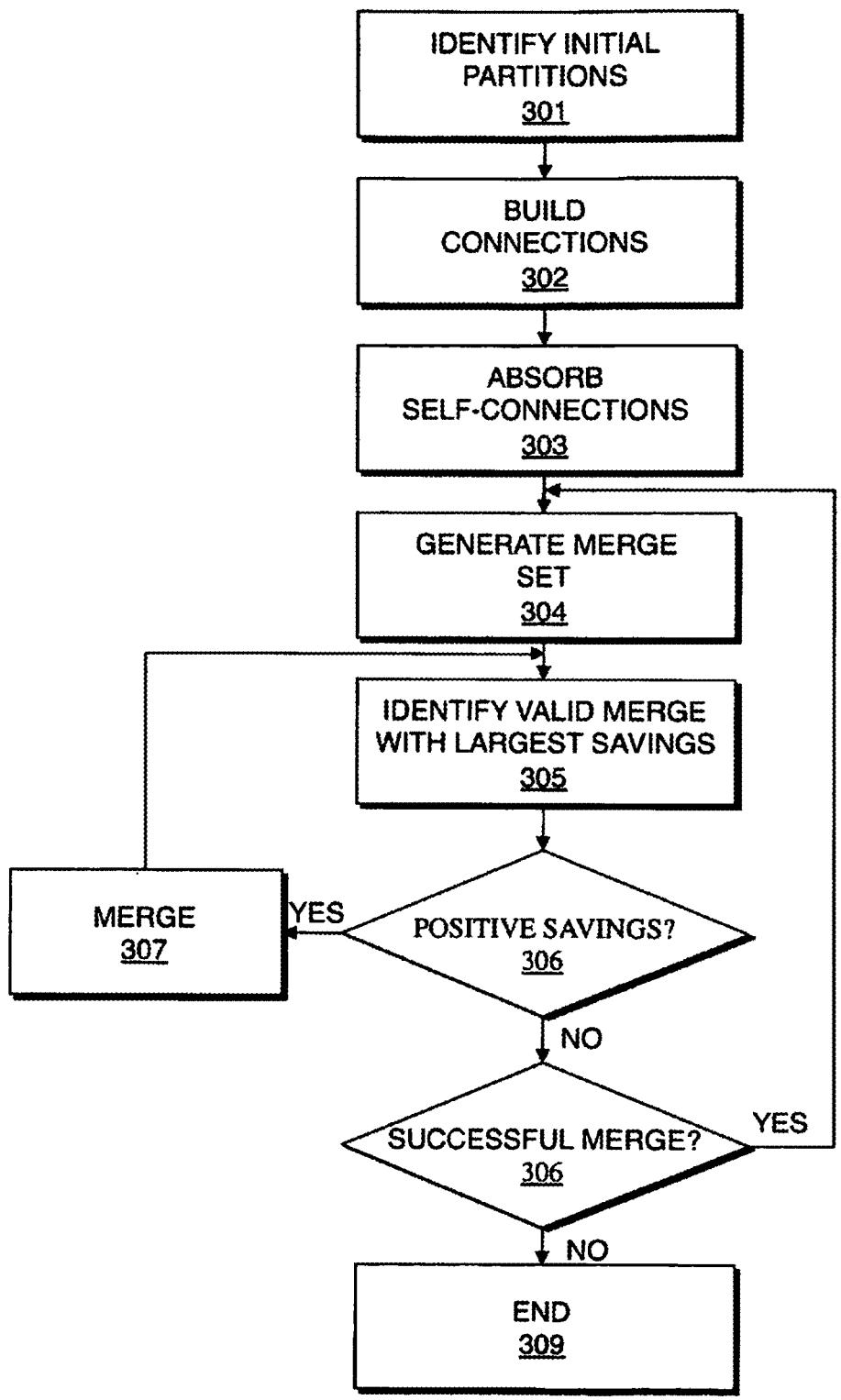
FIG. 3 is a flow chart illustrating a method for performing partitioning according to an exemplary embodiment of the present invention.

FIG. 3 is a flow chart illustrating a method for performing partition identification according to an exemplary embodiment of the present invention. The procedures illustrated in FIG. 3 may be used to implement 202 shown in FIG. 2. At 301, initial partitions are identified and labeled. According to an embodiment of the present invention, an initial partition has a single component. Components of the same type are designated as being a different instance of the same partition. According to one aspect of the present invention, components of the same type have the same functionality and have the same number of inputs and outputs. According to an embodiment of the present invention, each input and output pin of the netlist will be its own unique partition with one instance.

At 302, connections are built. According to an embodiment of the present invention, for each connection between an input of a component in the netlist and an output of a component in the netlist, a connection is added between the corresponding input of the partition instance that the first component is in and the corresponding output of the partition instance that the second component is in. The connections are mapped from (partition, instance, and output) to (partition, instance, input). Different instances of a same partition represent netlists with exactly the same structure, but the different instances can be connected to other partition instance pairs in different ways.

At 303, self-connections are absorbed. According to an embodiment of the present invention, connections existing between outputs and inputs of a same instance are removed.

Procedures 304-308 are used to expand the initial partitions identified in order to identify a partition of larger size. The initial partitions may be merged with other initial partitions and later merged with other initial partitions or other merged partitions based upon cost metrics until there are no more pairs of partitions to merge.

At 304, a merge set is generated. According to an embodiment of the present invention, the merge set identifies partitions that may be merged together. The merge set identifies the instance of the partitions that may be merged together, connections that would be absorbed with the merge, and cost savings associated with the merge. According to an embodiment of the present invention, cost savings may be computed by calculating the cost before and after a merge. The cost metric may be based upon a number of components in each partition to be merged and a number of instances of each partition that is to be merged. Not all instances of the partitions need be involved in the merge. It should be appreciated that the cost metric may be based upon other criteria, such as a number of connections, inputs, outputs, input/output pins, connections, and/or other parameters associated with a partition that changes with a merge.

At 305, a valid merge with a greatest cost savings is identified. According to an embodiment of the present invention, some merges are not allowed and are designated as being invalid. For example, according to an embodiment of the present invention, a merge between just one instance of two partitions is not allowed as it is not considered good savings. A merge between an instance of a first partition having connections to multiple instances of a second partition is not allowed as the first partition behaves as control logic for the different instances of the second partition. A merging of an instance of a partition with high fanout that leaves a significant number of fanouts unmerged is not allowed. A significant number of unmerged fanouts may be 10 or more fanouts.

According to an embodiment of the present invention, when a plurality of potential merges have the greatest cost savings (when a tie occurs), additional criteria may be evaluated to select a potential merge. For example, if the criteria for computing cost savings is the number of components and the number of instances in partitions before and after a merge, the criteria that may be used for a tie-breaker may include a number of connections, inputs, outputs, input/output pins, connections, and/or other parameters associated with the partitions before and after a merge.

At 306, it is determined whether the merge with the greatest cost saving identified has a positive cost savings. If the merge with the greatest cost savings is determined to have a positive cost saving, control proceeds to 307. If the merge with the greatest cost savings is determined not to have a positive cost savings, control proceeds to 308.

At 307, the merge identified at 305 is applied. A new partition is created for the merge. The size of the new partition is the sum of the sizes of the two original partitions. All the connections in the merge will be absorbed in the new partition. The set of inputs of the new partition is the union of the sets of inputs of the two original partitions, but inputs that have no more connection to the outside are removed. Inputs that are connected to the same output can be merged if this is the case for all instances of the partition. The set of outputs of the new partition is the union of the sets of outputs of the two original partitions, but outputs that have no connections to the outside are also removed. With the merging of the partitions, one or more other merges identified at 304 may be invalidated. Control returns to 305 to identify a next valid merge with a next greatest savings.

At 308, it is determined whether a merge was successfully applied. If it is determined that a merge was successfully applied, control returns to 304 to generate a new merge set with the newly applied merge. If it is determined that a merge was not successfully applied, control terminates the procedure at 309.

The procedure described with reference to FIG. 3 identifies a single level of partitions. It should be appreciated that multiple levels of partitions may also be identified according to embodiments of the present invention. This may be achieved by using the same partition identification procedure with different criteria for merging partitions.

FIGS. 1 through 3 are flow charts that illustrate embodiments of the present invention. Some of the techniques illustrated may be performed sequentially, in parallel or in an order other than that which is described and that the procedures described may be repeated. It should be appreciated that not all of the techniques described are required to be performed, that additional techniques may be added, and that some of the illustrated techniques may be substituted with other techniques.

FIGS. 4-8 illustrate an example of a method for identifying partitions according to an embodiment of the present invention. FIG. 4A illustrates an exemplary portion of a system according to an embodiment of the present invention. The exemplary portion of the system may be a portion of the system as described in an extraction netlist. With reference to procedure 301 in FIG. 3, initial partitions are identified. FIG. 4B illustrates initial partitions that are identified from the portion of the system in FIG. 4A. Each block in FIG. 4B represents a partition where each letter on the block denotes a partition type, and each number next to the partition denotes an instance of that partition. Inputs and outputs of each instance of a partition are also labeled.

With reference to procedure 302 in FIG. 3, connections are built. FIG. 4C illustrates a partitions table and a connections table. The partition tables lists the partitions in FIG. 4B, the components that make up the partitions, the number of instances of the partitions, and the size of the partitions with respect to number of components. The connections table lists the connections in FIG. 4B by identifying the source by partition, instance and output, and each destination by partition, instance, and input. Since there are no self-connections, procedure 303 in FIG. 3 is skipped.

With reference to procedure 304 in FIG. 3, a merge set is generated. FIG. 4D illustrates a merge set table. The merge set table lists the potential merges that may be applied to the partitions in FIG. 4B. The merge table identifies the partitions that may be merged, the instances of the partitions that may be merged, the connections that would be absorbed with the merge, a cost metric before the merge, a cost metric after the merge, and cost savings achieved with the merge. A potential merge includes a pair of partitions, and a set of two or more pairs of instances of partitions such that instances in the pairs are all not the same instance. According to an embodiment of the present invention, for each potential merge, there has to be at least one connection that occurs between each pair of partition instances. The set of these connections that occur between all instance pairs is also part of the potential merge.

With reference to procedure 305 in FIG. 3, the merges with the largest cost savings are merges 2 and 4. Merges 2 and 4 merge all instances of both partitions and both have a cost saving of 2. In order to determine which merge to identify as the merge with the largest cost savings, additional criteria may be used. Alternatively, control may arbitrarily select one of the merges when there is a tie in largest cost saving among more than one merge. In this example, merge 2, which merges partitions K and L, is selected as the merge with largest savings.

With reference to procedure 306, it is determined that the cost savings of 2 components is a positive cost savings.

With reference to procedure 307, merging of partitions K and L is applied, which results in a new partition N with two instances. Merging partitions K and L invalidates merges 3 and 4 because both merges 3 and 4 involve partition L. Control returns to procedure 305.

With reference to procedure 305, the only valid merge available is merge 1 which merges partitions J and M.

With reference to procedure 306, merge 1 yields a cost saving of 1 which is a positive cost savings.

With reference to procedure 307, merging of partitions J and M is applied, which results in a new partition O with two instances. Control returns to procedure 305.

With references to procedures 305 and 306, no additional valid merges are available to yield positive savings. Control determines at procedure 308 that successful merges have occurred and returns to 304 to generate a new merge set with new partitions N and O. FIG. 4E illustrates the newly created partitions N and O after a first round of expansion from performing procedures 301-308.

FIG. 5A illustrates an updated partitions table and an updated connections table after a first round of expansion that created new partitions N and O.

With reference to procedure 304 in FIG. 3, a merge set is generated with the new partitions created after the first round of expansion. FIG. 5B illustrates a merge set table after the first round of expansion. As shown, two merges are identified. The first merge involves a merge between partitions O and N, and a second merge involves a merge between partitions J and N.

With reference to procedure 305 in FIG. 3, both the first merge between partitions O and N and the second merge between partitions J and N yield a cost savings of 2 components. In this example, control selects merge 2 between partitions J and N as the merge with the largest cost savings.

With reference to procedure 306, it is determined that the cost savings of 2 components is a positive cost savings.

With reference to procedure 307, the merging of partitions J and N is applied, which results in a new partition P with two instances. Merging partitions J and N invalidates merge 1 because merge 1 involves partition N. Control returns to procedure 305.

Figure 5C:
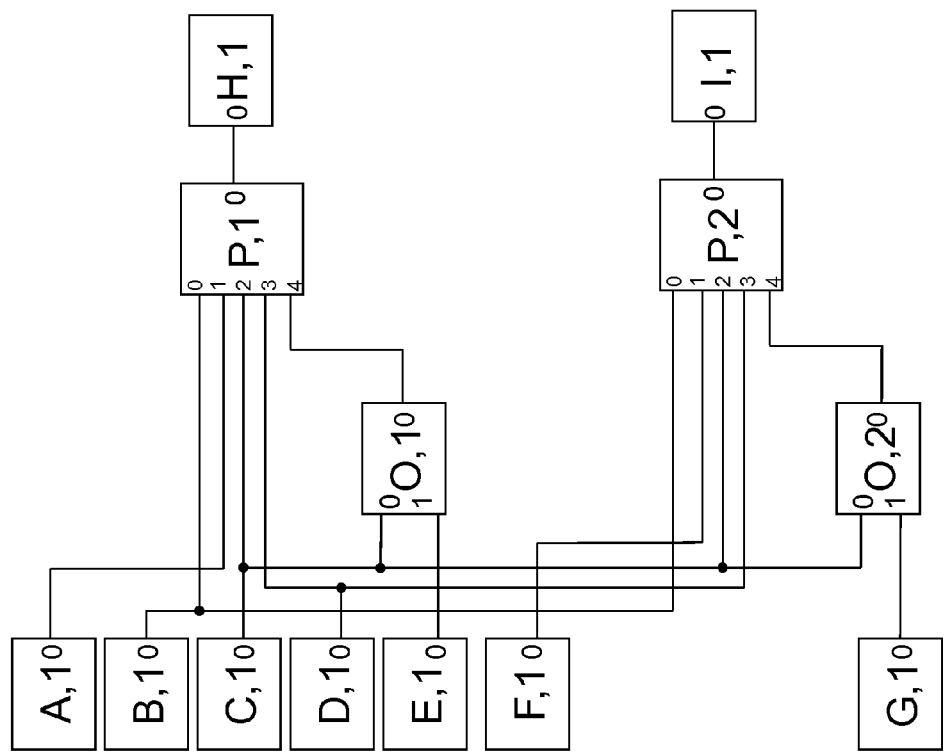
FIG. 5C illustrates merges applied during a second round of expansion.

With references to procedures 305 and 306, no additional valid merges are available to yield positive savings. Control determines at procedure 308 that a successful merge has occurred and returns to 304 to generate a new merge set with new partition P. FIG. 5C illustrates the newly created partition P after a second round of expansion from performing procedures 304-308.

FIG. 6A illustrates an updated partitions table and an updated connections table after a second round of expansion that created new partition P.

With reference to procedure 304 in FIG. 3, a merge set is generated with the new partitions created after the second round of expansion. FIG. 6B illustrates a merge set table after the second round of expansion. As shown, a single merge is identified. The merge involves merging partitions O and P.

With reference to procedure 305 in FIG. 3, the merging of partitions O and P yield a cost savings of 2 components. This merge is identified as the merge with the largest cost savings.

With reference to procedure 306, it is determined that the cost savings of 2 components is a positive cost savings.

With reference to procedure 307, the merging of partitions O and P is applied, which results in a new partition Q with two instances. Control returns to procedure 305.

Figure 6C:
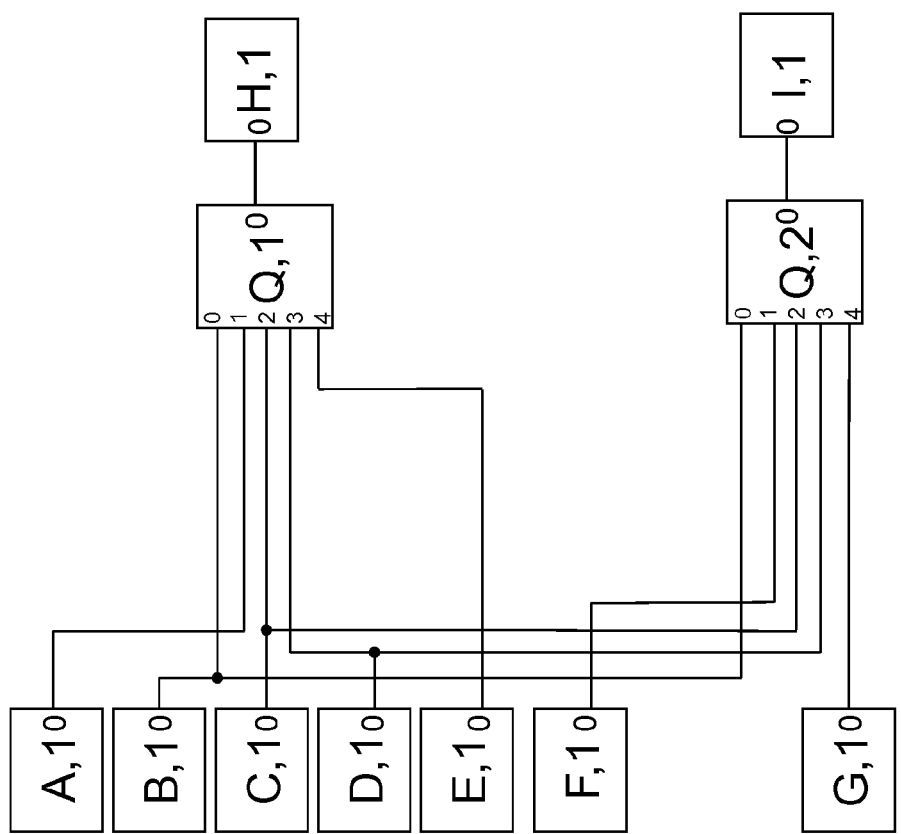
FIG. 6C illustrates merges applied during a third round of expansion according to an embodiment of the present invention.

With references to procedures 305 and 306, no additional valid merges are available to yield positive savings. Control determines at procedure 308 that a successful merge has occurred and returns to 304 to generate a new merge set with new partition Q. FIG. 6C illustrates the newly created partition P after a third round of expansion from performing procedures 304-308.

FIG. 7 illustrates an updated partitions table and an updated connections table after a third round of expansion that created new partition Q.

With reference to procedure 304 in FIG. 3, a merge set is generated with the new partitions created after the third round of expansion. No merges are identified.

With references to procedures 305 and 306, no additional valid merges are available to yield positive savings. Control determines at procedure 308 that no successful merge has occurred and terminates the procedure at 309.

Figure 4A:
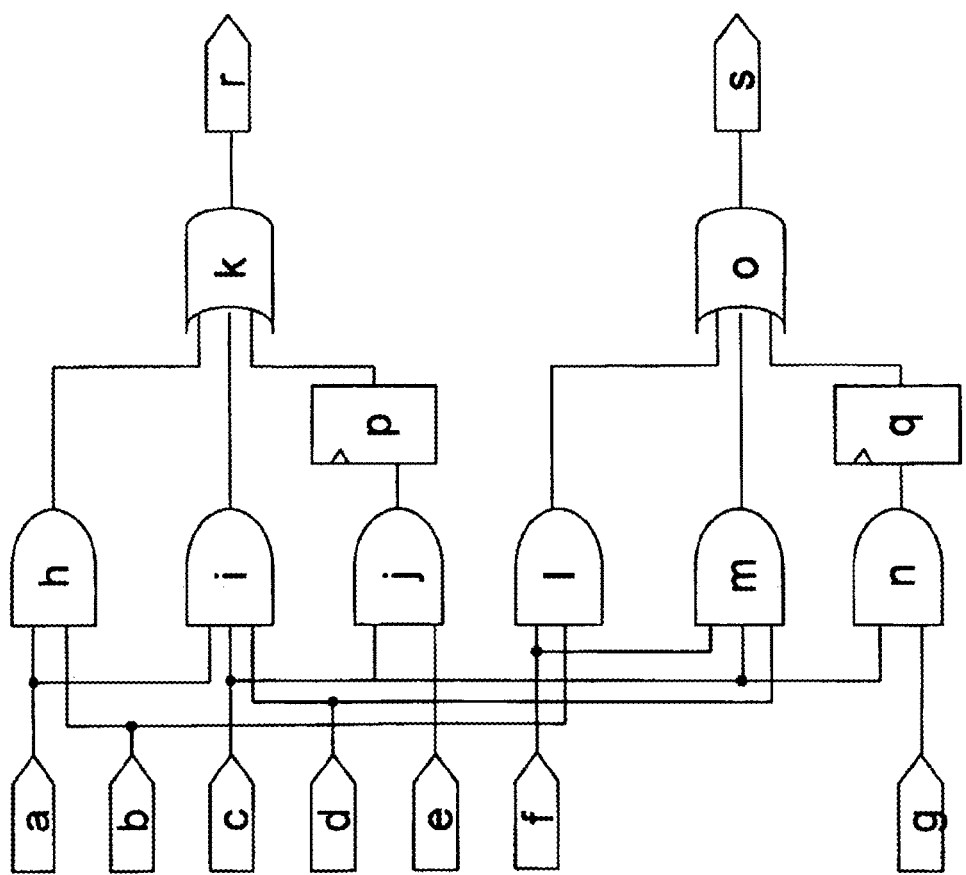
FIG. 4A illustrates an exemplary system according to an exemplary embodiment of the present invention.
Figure 4B:
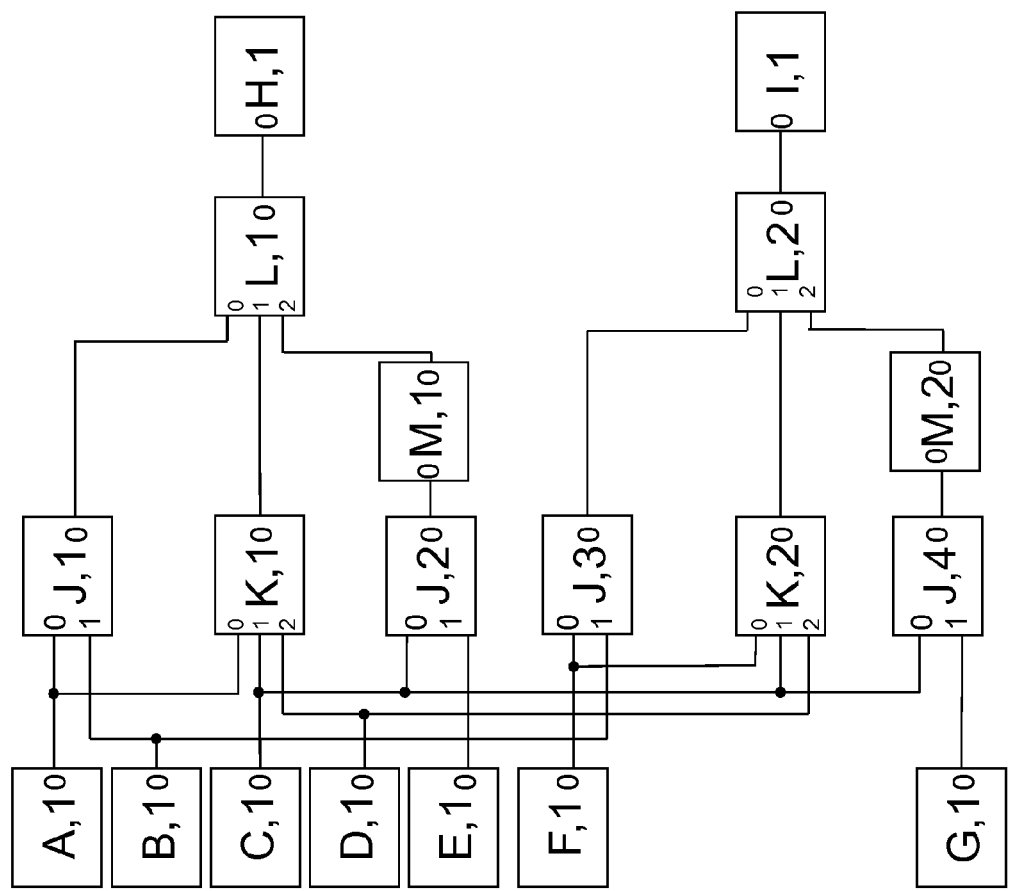
FIG. 4B illustrates initial partitions of the exemplary system according to an embodiment of the present invention.
Figure 4E:
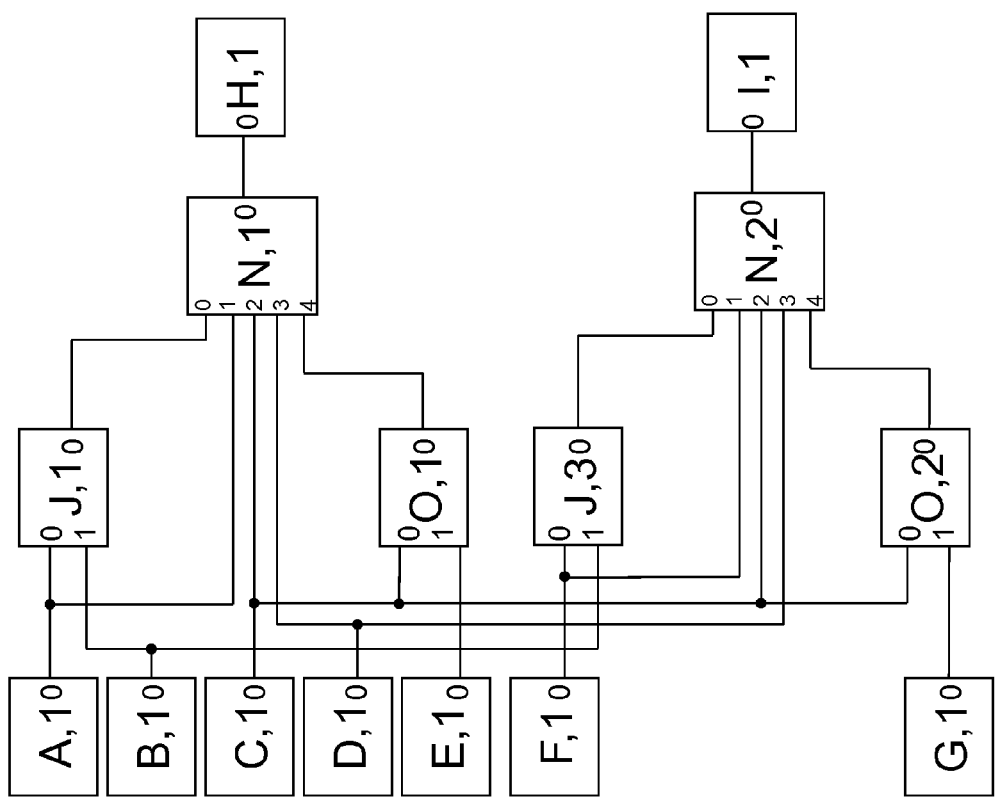
FIG. 4E illustrates applying merges to initial partitions according to an embodiment of the present invention.
Figure 8A:
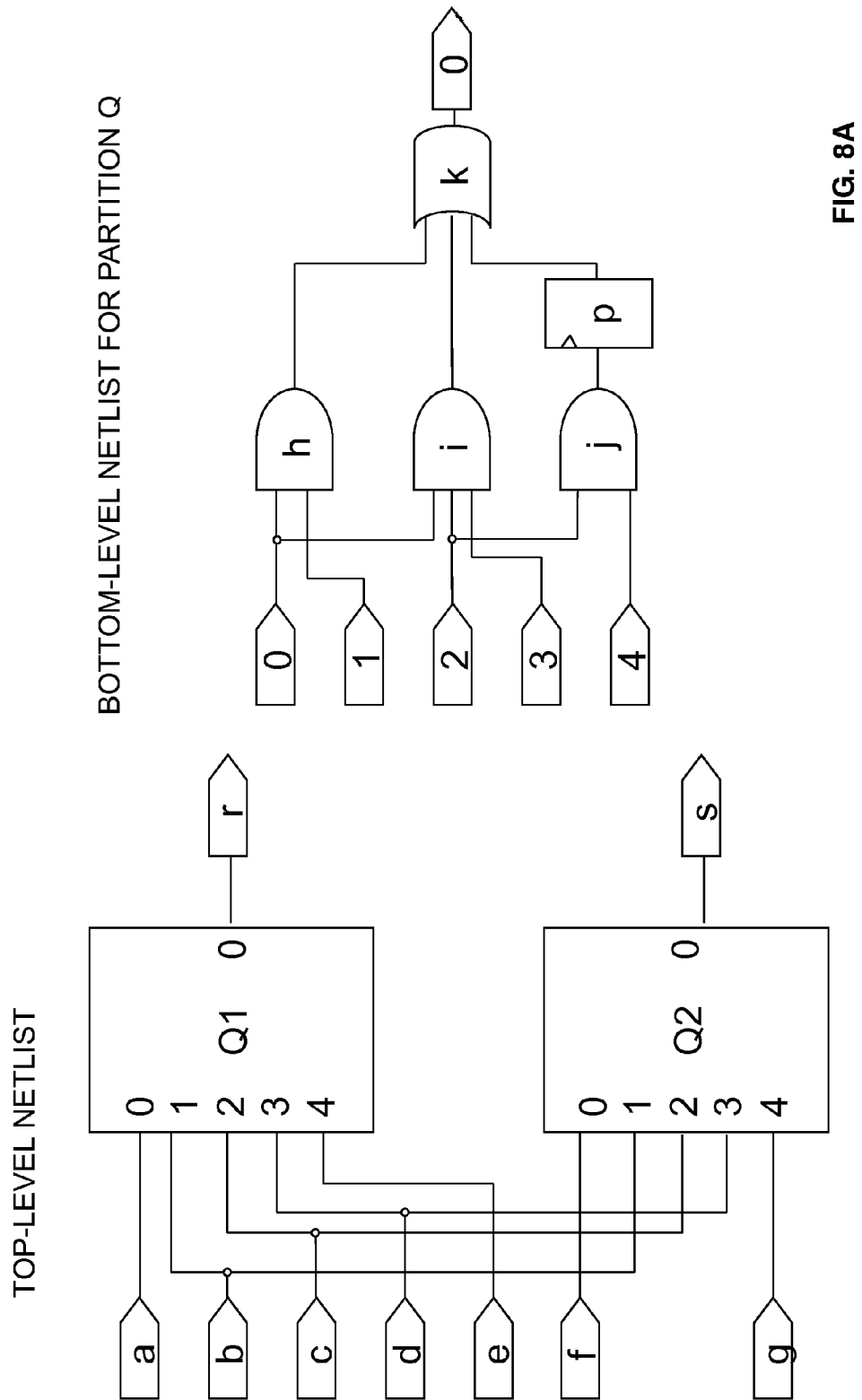
FIG. 8A illustrates a top-level netlist and a bottom-level netlist for the system according to an embodiment of the present invention.
Figure 8B:
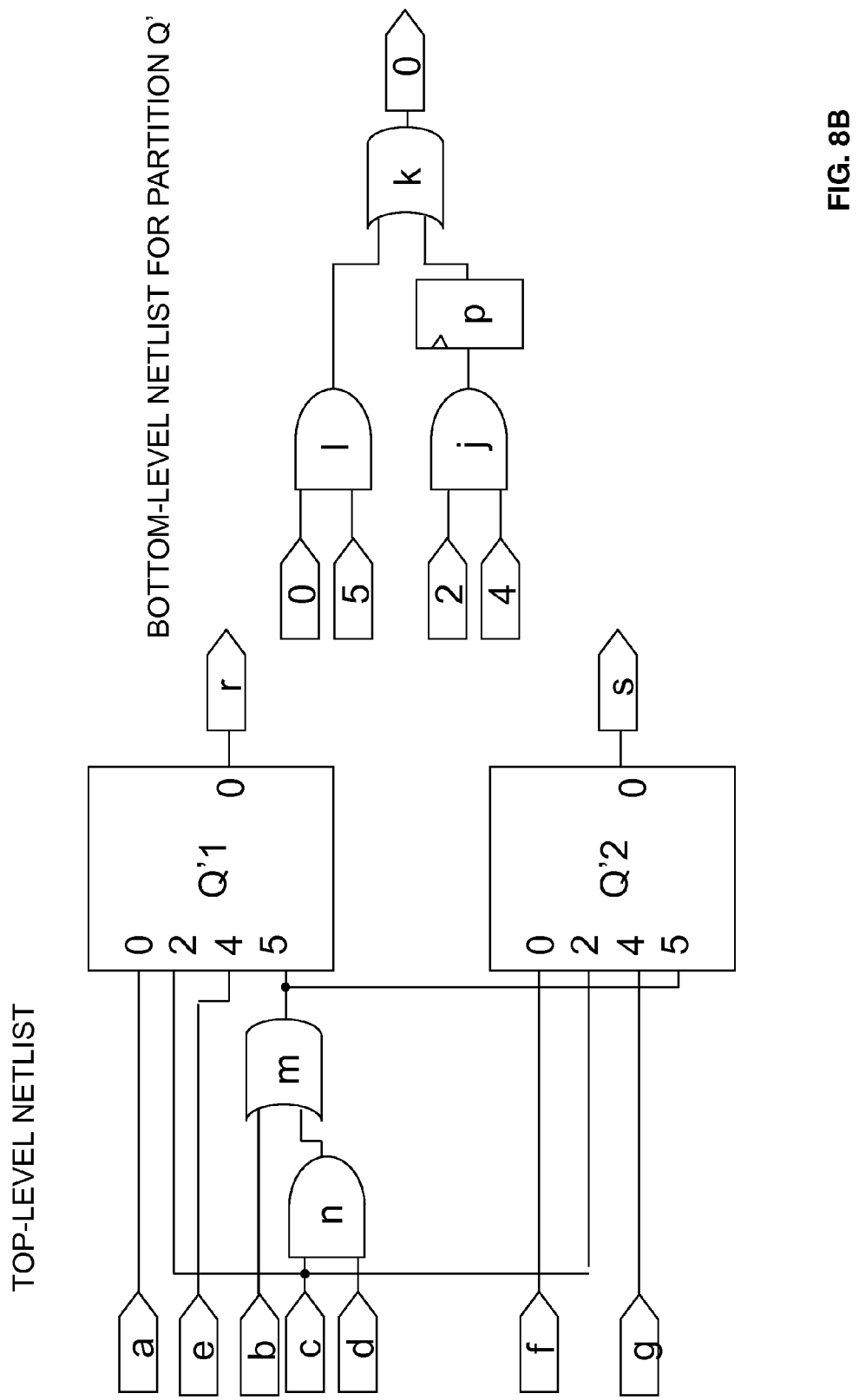
FIG. 8B illustrates a top-level netlist and a bottom-level netlist for the system after performing factoring according to an embodiment of the present invention.

FIG. 8A illustrates the results of applying the partitions identified to the extraction netlist illustrated in FIG. 4A. As shown in this example, partitions with two or more instances and a minimum of a predetermined threshold of components are applied. A partition netlist for the components in partition Q is generated. In the extraction netlist, the partition Q is replaced with a substitute component that refers to the partition netlist. FIG. 8A illustrates a top-level netlist that illustrates the extraction netlist of FIG. 4A with substitute components representing partition Q. FIG. 8A also illustrates a bottom-level netlist that illustrates the netlist for partition Q.

It should be appreciated that further processing can be performed on the partitions identified during the performing of optimizations. For example, as shown in FIG. 8A, both Q1 and Q2 are fed by the same gates for inputs 1, 2, and 3. The netlist for partition Q may be factored such that inputs 1, 2, and 3 are used separately and components can be reused between partitions Q1 and Q2. The function in Q is o0=i0 & i1+i0 & i2 & i3+p. This can be expressed as o0=i0 & (i1+i2 & i3)+p. Therefore, i1+i2 & i3 can be factored out and reused between the two instances Q1 and Q2. The top-level netlists and bottom-level netlist illustrated in FIG. 8A can be expressed with the top-level netlist and bottom level netlist illustrated in FIG. 8B. Other optimizations and modifications to partitions may also be applied during the optimization phase. For example, constant propagation (where logic is removed from a partition if inputs to a partition are constant for all instances), duplicate removal (where if two outputs of a partition are identical, the outputs can be merged allowing further optimizations in the top-level netlist), and the removal of an instance of a partition when it has more constant or duplicate inputs than other instances of the same partition may be performed. It should be appreciated that other optimization procedures may also be performed.

Designs for systems often have parts of the design repeated. The larger the designs, the more often this will be the case. Embodiments of the present invention take advantage of this for savings in compile time and memory usage, and for achieving better quality of results for resource usage and clock speed.

Embodiments of the present invention identifies chunks or partitions in a netlist that is repeated multiple times and replaces the partitions with a higher-level substitute component. A separate netlist is used to represent the contents of the substitute component. A hierarchical netlist is built where each netlist representing the substitute component may also include other substitute components. Utilizing a hierarchical netlist in this manner may save runtime and memory. Memory may be saved by having to keep one copy of each partition instead of one copy for each instance of the partition. Runtime may be saved by having to synthesize each partition once instead of once for each instance of the partition.

Utilizing a hierarchical netlist may also provide for better quality of results during synthesis. By identifying a number of instances that occur for a partition, different decisions may be made for synthesizing that partition. For example, more aggressive algorithms may be performed to synthesize a partition that has a 1,000 instances over a partition that has 2 instances. More aggressive algorithms that yield better quality results for resource utilization, clock speed, and placement at the expense of long compilation runtime may be a good choice for use on partitions having large number of instances. It should be appreciated that partition boundaries may be changed during the performing of optimizations.

According to an embodiment of the present invention, partitions that are identified are required to be sufficiently large. A partition may have a size requirement such as having more than a predetermined number of components. Partitions that are too small in size may not achieve the benefit of saving much runtime or memory and may disrupt synthesis of surrounding logic. Partitions identified may also have the requirement of having more than a predetermined number of instances. Partition boundaries may also be required to be in locations likely to be look up table boundaries to avoid preventing optimizations across boundaries. Registers and high fanout nodes are good candidates for partition boundaries.

Figure 9:
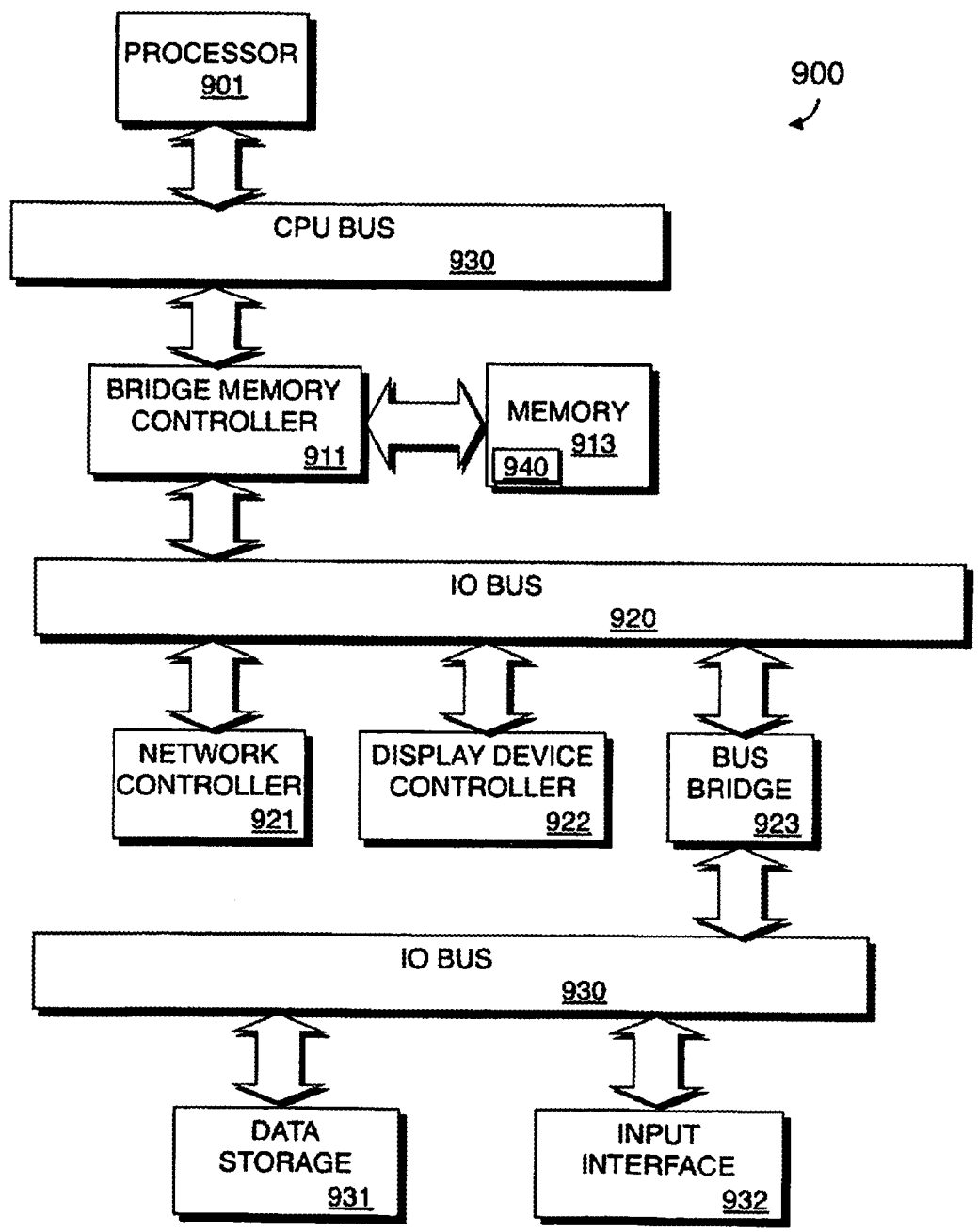
FIG. 9 illustrates a block diagram of a computer system implementing a system designer according to an embodiment of the present invention.

FIG. 9 illustrates a block diagram of a computer system implementing a system designer according to an embodiment of the present invention. As shown, the computer system 900 includes a processor 901. The processor 901 is coupled to a CPU bus 910 that transmits data signals between the processor 901 and other components in the computer system 900.

The computer system 900 includes a memory 913. The memory 913 may be a dynamic random access memory device, a static random access memory device, and/or other memory device. The memory 913 may store instructions and code represented by data signals that may be executed by the processor 901. A bridge memory controller 911 is coupled to the CPU bus 910 and the memory 913. The bridge memory controller 911 directs data signals between the processor 901, the memory 913, and other components in the computer system 900 and bridges the data signals between the CPU bus 910, the memory 913, and a first IO bus 920.

The first IO bus 920 may be a single bus or a combination of multiple buses. The first IO bus 920 provides communication links between components in the computer system 900. A network controller 921 is coupled to the first IO bus 920. The network controller 921 may link the computer system 900 to a network of computers (not shown) and supports communication among the machines. A display device controller 922 is coupled to the first IO bus 920. The display device controller 922 allows coupling of a display device (not shown) to the computer system 900 and acts as an interface between the display device and the computer system 900.

A second IO bus 930 may be a single bus or a combination of multiple buses. The second IO bus 930 provides communication links between components in the computer system 900. A data storage device 931 is coupled to the second IO bus 930. The data storage device 931 may be a hard disk drive, a floppy disk drive, a CD-ROM device, a flash memory device or other mass storage device. An input interface 932 is coupled to the second IO bus 930. The input interface 932 allows coupling of an input device to the computer system 900 and transmits data signals from an input device to the computer system 100. A bus bridge 923 couples the first IO bus 920 to the second IO bus 930. The bus bridge 923 operates to buffer and bridge data signals between the first IO bus 920 and the second IO bus 930. It should be appreciated that computer systems having a different architecture may also be used to implement the computer system 900.

A system designer 940 may reside in memory 913 and be executed by the processor 901. The system designer 940 may operate to synthesize the system, place the system on a target device, route the system, assemble the system, and program a target device to implement the system. According to an embodiment of the present invention, the system designer identifies a partition in the system having a plurality of instances from an extraction netlist. Synthesis optimizations are performed on the partition to generate a synthesis optimization solution. The synthesis optimization solution is applied to the plurality of instances in the system. By identifying a partition with multiple instances and optimizing the partition once, savings in compile time and memory may be achieved. In addition, more aggressive optimization procedures may be applied to partitions identified having a large number of instances in order to achieve better quality of results such as reduced resource usage and improved clock speed.

Figure 10:
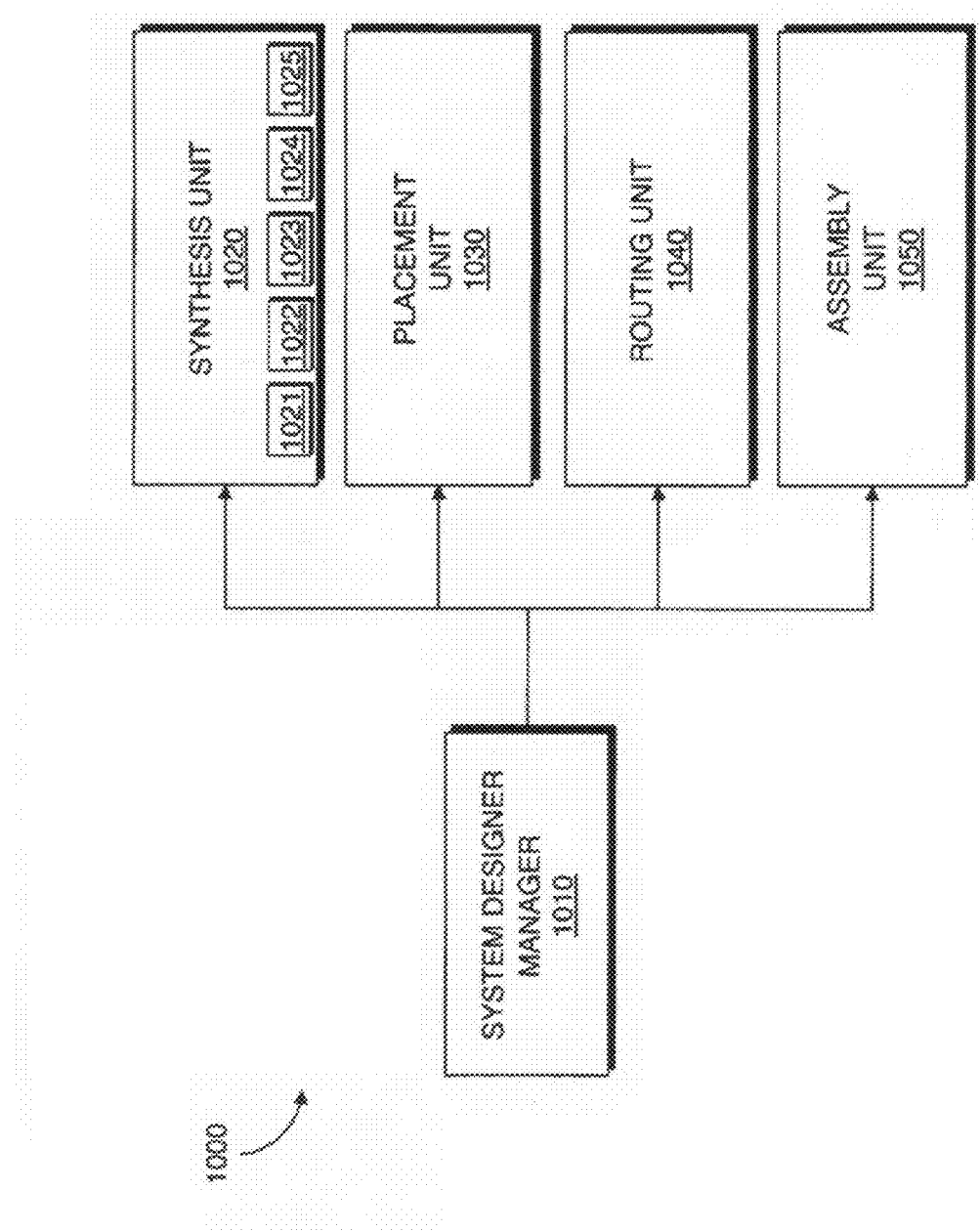
FIG. 10 is a block diagram of a system designer according to an exemplary embodiment of the present invention.

FIG. 10 illustrates a system designer 1000 according to an exemplary embodiment of the present invention. The system designer 1000 may be used to implement the system designer 940 shown in FIG. 9 and may perform procedures described in FIGS. 1, 2, and 3. The system designer 900 may be a CAD tool for designing a system on a target device. The target device may be, for example, an ASIC, a structured ASIC, an FPGA, a programmable logic device (PLD), a printed circuit board (PCB), or other circuitry. FIG. 10 illustrates modules implementing an embodiment of the system designer 1000. According to one embodiment, system design may be performed by a computer system, such as for example the computer system illustrated in FIG. 9, executing sequences of instructions represented by the modules shown in FIG. 10. Execution of the sequences of instructions causes the computer system to support system design as will be described hereafter. In alternate embodiments, hard-wire circuitry may be used in place of or in combination with software instructions to implement the present invention. Thus, the present invention is not limited to any specific combination of hardware circuitry and software. The system designer 1000 includes a system designer manager 1010. The system designer manager 1010 is connected to and transmits data between the components of the system designer 1000.

Block 1020 represents a synthesis unit. According to an embodiment of the present invention, the synthesis unit 1020 includes an extraction unit 1021 that performs extraction on a design of the system to create an initial structural representation of the system. Extraction includes generating a logical representation of the system from a high level description (HDL) of the system. The high level description of the system may be in the form of schematics, VHDL, Verilog or other design definition. The logical representation may include a representation that includes structural components such as functional blocks and registers ("components"), such as logic gates and logic elements, required for the system. According to an embodiment of the present invention, initial optimizations may also be performed during extraction. These initial optimizations may include the cleanout of netlists and constant propagation. An extraction netlist is created during extraction and is written into storage.

The synthesis unit 1020 includes a partition identification unit 1022 that identifies partitions in the system from the extraction netlist. According to an embodiment of the synthesis unit 1020, the partition identification unit 1022 identifies partitions based upon their size and number of instances they occur in the extraction netlist. Partitions in the extraction netlist may be replaced with a higher-level gate (substitute component) to form a top-level netlist. A separate netlist may be generated for each substitute component. The netlist for a substitute component may be referred to as a bottom-level netlist. Together, the top-level and bottom-level extraction netlists form a hierarchical netlist. According to an embodiment of the present invention, the partition identification unit 1022 may perform the procedures described with reference to FIG. 3.

The synthesis unit 1020 includes an optimization unit 1023 that performs synthesis optimizations on the top-level and bottom-level extraction netlists created by the partition identification unit 1022 to reduce area and to improve speed of the system. The optimizations may include performing procedures such as high level logic synthesis of adders, multiplexers and state machines, lower level multi level synthesis optimizations that operate on combinational gates and registers, and technology mapping to create a netlist of blocks that are supported by the resources available on the target device. It should be appreciated that the lower level multi level synthesis optimizations may include sequential synthesis transformations such as register retiming, duplication, and merging. A synthesis optimizations netlist is created during synthesis optimizations. According to an embodiment of the present invention, a different class of optimization procedures or algorithms may be applied to the bottom-level netlists that include partitions having a plurality of instances. The different class of procedures or algorithms may be more aggressive and more likely to yield better quality of results by reducing the number of resources required for implementing the partition and/or increasing the speed of the partition. The class of procedures or algorithms may be different than the class of procedures or algorithms used for optimizing other circuits in the system design in that they require more time to execute. Utilizing these more aggressive, but slower algorithms on the partitions in the bottom-level netlist may be beneficial in that the improved results generated may be implemented many times as oppose to once or only a few times. Top-level and bottom-level optimization netlists are created during optimization.

The synthesis unit 1020 includes a technology mapping unit 1024 that performs technology mapping on the optimized logic design in the top-level and bottom-level optimization netlists. According to an embodiment of the synthesis unit 1020, mapping includes determining how to implement logic gates and logic elements in the optimized logic representation with resources available on the target device. The resources available may include LUTs and other resources. According to an embodiment of the present invention, top-level and bottom-level technology mapped netlists are generated from the technology mapping.

The synthesis unit 1020 includes a netlist restoration unit 1025. According to an embodiment of the synthesis unit 1020, the netlist restoration unit flattens out the hierarchical netlists by merging the bottom-level technology mapped netlist with the top-level technology mapped netlist. Portions of the bottom-level netlist representing a substitute component is merged back with the top-level netlist to form a single technology-mapped netlist.

Block 1030 represents a placement unit. The placement unit 1030 places the system on to the target device by determining which components or areas on the target device are to be used for specific functional blocks and registers. According to an embodiment of the system designer 1000, the placement unit 1030 first determines how to implement portions of the optimized logic design in clusters. Clusters may represent a subset of the components on the logic design. A cluster may be represented, for example, by a number of standard cells grouped together. In this embodiment, after portions of the optimized logic design are implemented in clusters, the clusters may be placed by assigning the clusters to specific positions on the target device. The placement unit 1030 may utilize a cost function in order to determine a good assignment of resources on the target device.

Block 1040 represents a routing unit. The routing unit 1040 determines the routing resources on the target device to use to provide interconnection between the components implementing functional blocks and registers of the logic design.

Block 1050 represents an assembly unit. The assembly unit 1050 creates a data file that includes information determined by the compilation procedure performed by the system designer 1000. The data file may be a bit stream that may be used to program a target device. According to an embodiment of the present invention, the data file generated may be transmitted to another computer system to allow the design of the system to be further processed. Alternatively, the data file may be transmitted to another computer system which may be used to program the target device according to the system design. By programming the target device with the data file, components on the target device are physically transformed to implement the system. It should be appreciated that the design of the system may also be output in other forms such as on a display device or other medium.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 11:
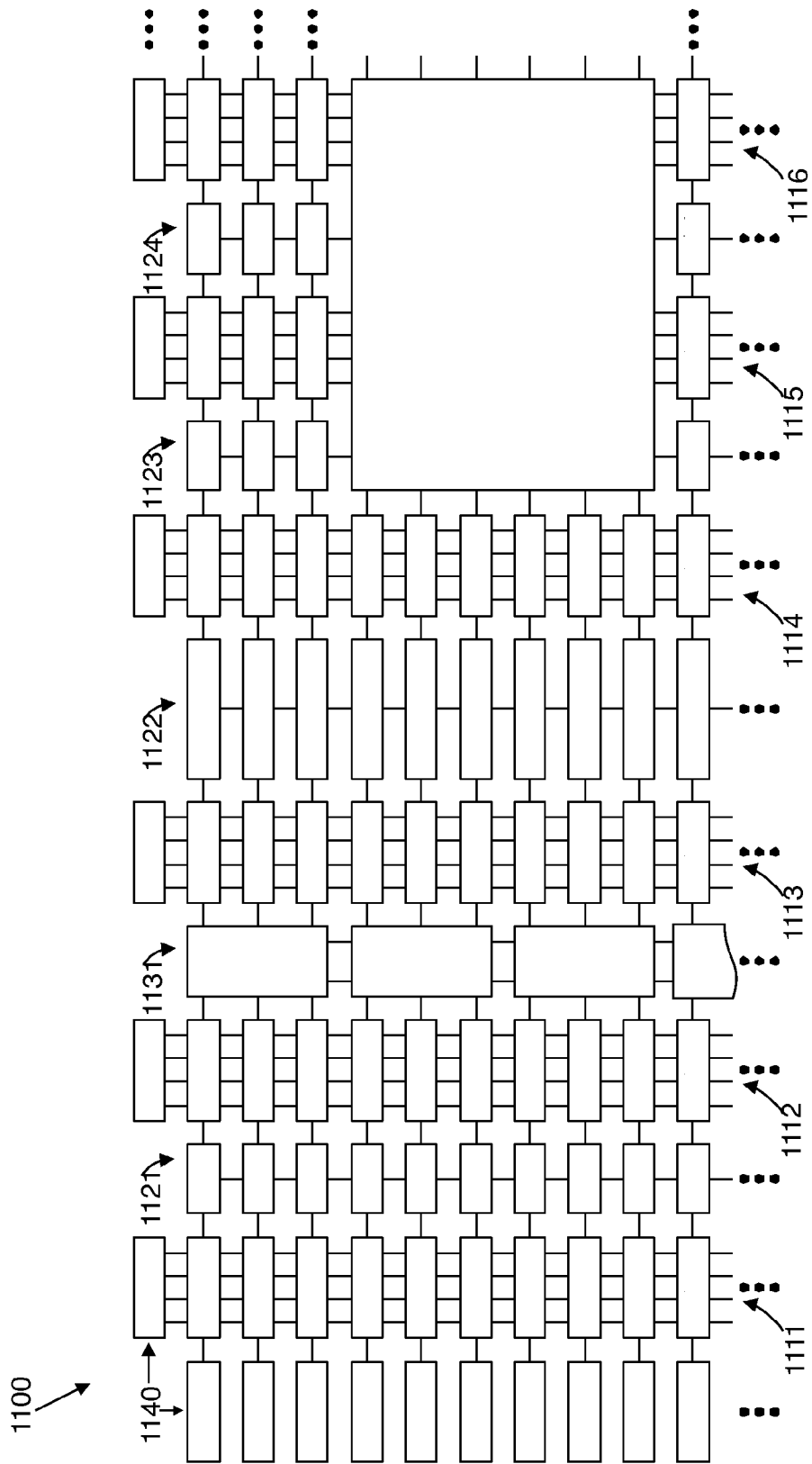
FIG. 11 illustrates an exemplary target device according to an embodiment of the present invention.

FIG. 11 illustrates a device 1100 that may be used to implement a target device according to an embodiment of the present invention. The device 1100 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1100. Columns of LABs are shown as 1111-1116. It should be appreciated that the logic block may include additional or alternate components.

The device 1100 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1100. Columns of memory blocks are shown as 1121-1124.

The device 1100 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1100 and are shown as 1131.

The device 1100 includes a plurality of input/output elements (IOEs) 1140. Each IOE feeds an IO pin (not shown) on the device 1100. The IOEs 1140 are located at the end of LAB rows and columns around the periphery of the device 1100. Each IOE may include a bidirectional IO buffer and a plurality of registers for registering input, output, and output-enable signals.

The device 1100 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, the method comprising:
   identifying a partition having a plurality of instances in the system from an extraction netlist, wherein the partition implements a component from the extraction netlist and each instance of the partition implements an identical component having a same functionality as the component, wherein identifying the partition comprises identifying an initial partition, and expanding the initial partition, wherein expanding the initial partition comprises building a merge set, identifying a merge from the merge set having a highest savings in cost relative to other merges from the merge set, and applying the merge identified with the highest savings in cost;
   performing synthesis optimizations on the partition to generate a synthesis optimization solution; and
   applying the synthesis optimization solution for the partition selectively to the plurality of instances of the partition in the system, wherein at least one of the identifying, performing, and applying is performed by a processor.

2. The method of claim 1, wherein identifying the initial partition comprises identifying the component from the extraction netlist and its connection to other initial partitions.

3. The method of claim 1, wherein the cost is a function of a number of components in a partition and a number of instances of the partition that exists.

4. The method of claim 1, wherein the cost is a function of a number of connections in a partition.

5. The method of claim 1, wherein the cost is a function of a number of inputs in a partition.

6. The method of claim 1, further comprising:
   identifying another merge with a partition with a next highest cost savings; and
   applying the another merge with the next highest cost savings relative to the other merges in the merge set.

7. The method of claim 1, further comprising applying a merge resulting in a highest number of inputs and outputs saved when more than one merge is identified with a partition with a highest cost savings.

8. The method of claim 1, further comprising applying a merge resulting in a highest number of connections absorbed when more than one merge is identified with a partition with a highest cost savings.

9. The method of claim 1, wherein performing synthesis optimizations on the partition to generate a synthesis optimization solution comprises:
   identifying a number of instances of the partition in the extraction netlist; and
   applying synthesis optimization procedures in response to the number of instances.

10. The method of claim 9, wherein when the number of instances of the partition equals or exceeds a threshold number, a first class of optimization procedures is applied to aggressively optimize the partition that require a larger amount of time to perform than a second class of optimization procedures applied to partitions that have fewer instances than the threshold number.

11. The method of claim 1, further comprising:
creating a hierarchical netlist after identifying the partition with a top-level netlist that includes the extraction netlist with each instance of the partition represented as a generic component, and a bottom-level netlist that includes the partition.

12. The method of claim 11, wherein applying the synthesis optimization solution to the plurality of instances in the system comprises merging the optimized bottom-level netlist with the optimized top-level netlist.

13. A non-transitory computer-readable medium including a sequence of instructions stored thereon for causing a processor to execute a method comprising:
identifying a plurality of partitions in a system and a number of instances of each partition of the plurality of partitions in an extraction netlist, wherein each partition of the plurality of partitions implements a component in the system; and
performing synthesis optimizations on the plurality of partitions to generate optimization solutions, wherein a class of optimization procedures performed on one partition of the plurality of partitions is determined in response to the number of instances of the one partition of the plurality of partitions which occurs in the extraction netlist.

14. The non-transitory computer-readable medium of claim 13, wherein a first class of optimization procedures is performed on the one partition of the plurality partitions if the one partition of the plurality of partitions has greater than or equal to a threshold number of instances, and a second class of optimization procedures is performed on the one partition of the plurality of partitions if the one partition of the plurality of partitions has fewer than the threshold number of instances.

15. The non-transitory computer-readable medium of claim 14, wherein the first class of optimization procedures requires a larger amount of time to complete than the second class of optimization procedures.

16. The non-transitory computer-readable medium of claim 13, wherein the number of instances is in a magnitude of 100.

17. The non-transitory computer-readable medium of claim 14, wherein the threshold number of instances is in a magnitude of 1000.

18. The non-transitory computer-readable medium of claim 13, wherein the method further comprises applying the optimization solutions to the instances of each partition of the plurality of partitions in the system.

19. The non-transitory computer-readable medium of claim 13, wherein identifying the plurality of partitions comprises:
identifying initial partitions; and
expanding the initial partitions.

20. The non-transitory computer-readable medium of claim 19, wherein identifying the initial partitions comprises identifying a component from the extraction netlist and its connection to other initial partitions.

21. The non-transitory computer-readable medium of claim 19, wherein expanding the initial partition comprises:
building a merge set;
identifying a merge from the merge set having a highest savings in cost relative to other merges from the merge set; and
applying the merge identified with the highest savings in cost.

22. The non-transitory computer-readable medium of claim 21, wherein cost is a function of a number of gates in a partition and a number of instances of the partition that exists.

23. The non-transitory computer-readable medium of claim 13, wherein the synthesis optimizations comprises factoring.

24. A system designer comprising:
a synthesis unit having a partition identification unit that identifies a partitions in a system with a plurality of instances in an extraction netlist, and an optimization unit that performs synthesis optimizations on the partitions to generate a synthesis optimization solution and to apply the synthesis optimization solutions only to the plurality of instances in the system, wherein the partition implements a component in the system, and wherein each instance of the partition implements an identical component in the system, wherein the optimization unit applies a first class of optimization procedures on a first partition having a number of instances that exceed a redetermined value and a second class of optimization procedures on a second partition having a number of instances that does not exceed the predetermined value.

25. The system designer of claim 24, wherein the partition identification unit identifies an initial partition by identifying a component from the extraction netlist, and expands the initial partition by building a potential merge set, identifies a merge with a partition with a highest cost savings, and applies the merge with the highest cost savings.

26. The system designer of claim 24, further comprising:
a placement unit that places the system on a target device; and
a routing unit that routes the system on the target device.

* * * * *